June 7, 1932. J. BIJUR 1,862,513
STEERING KNUCKLE LUBRICATION
Original Filed Sept. 26, 1925   5 Sheets-Sheet 1
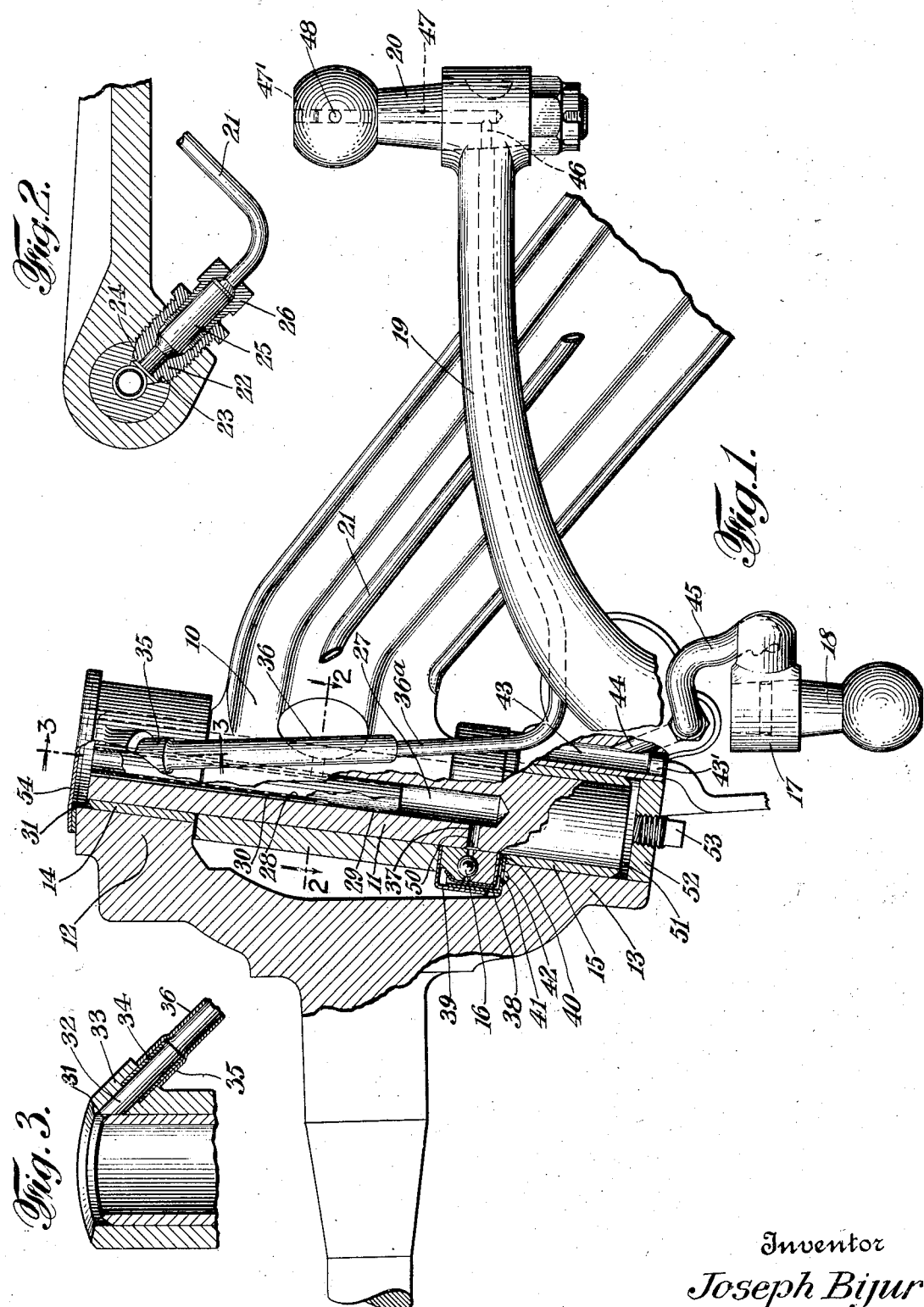
Inventor
Joseph Bijur
By his Attorneys
Dean, Fairbank, Obright & Hirsch

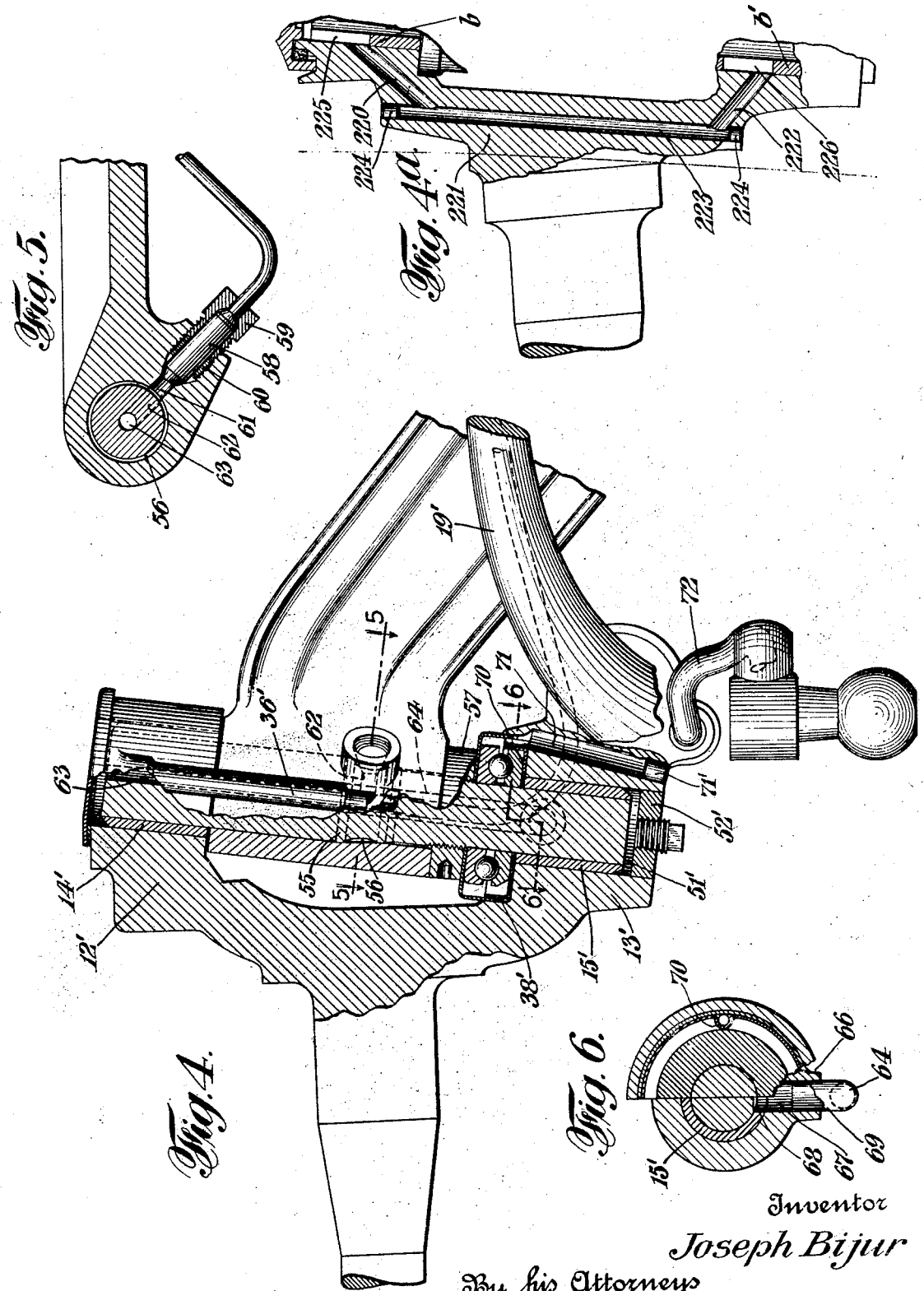

June 7, 1932. J. BIJUR 1,862,513
STEERING KNUCKLE LUBRICATION
Original Filed Sept. 26, 1925 5 Sheets-Sheet 3
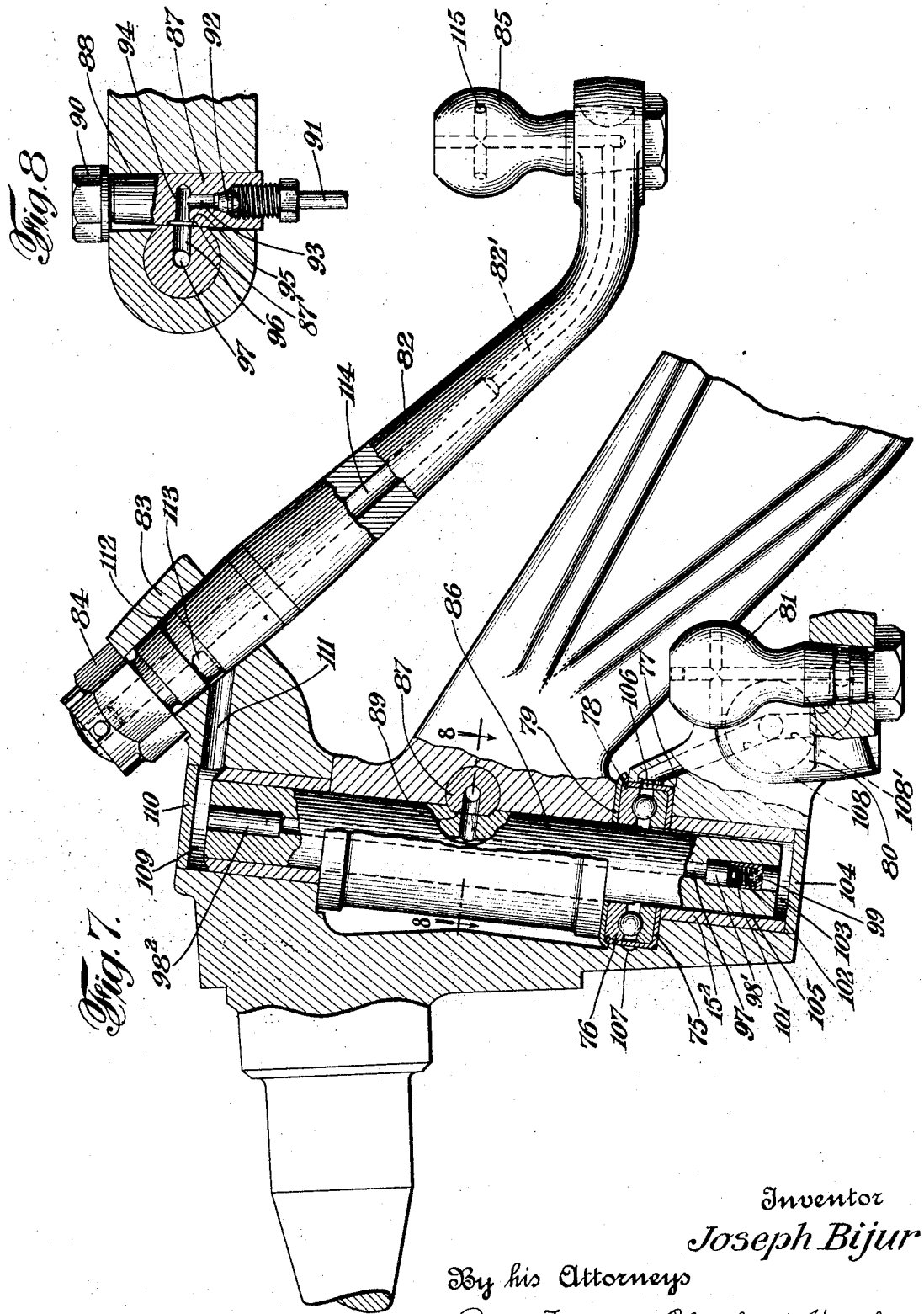

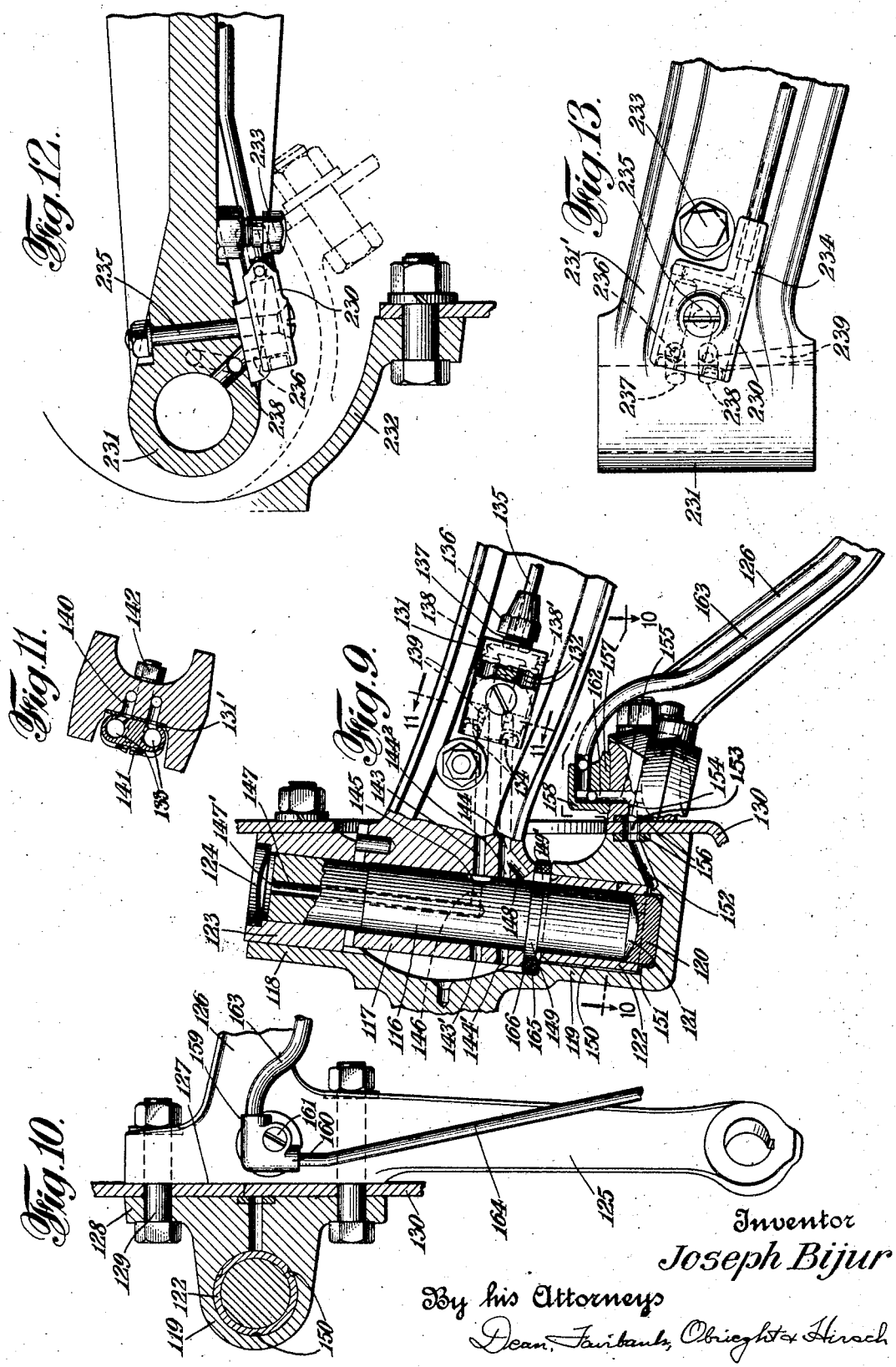

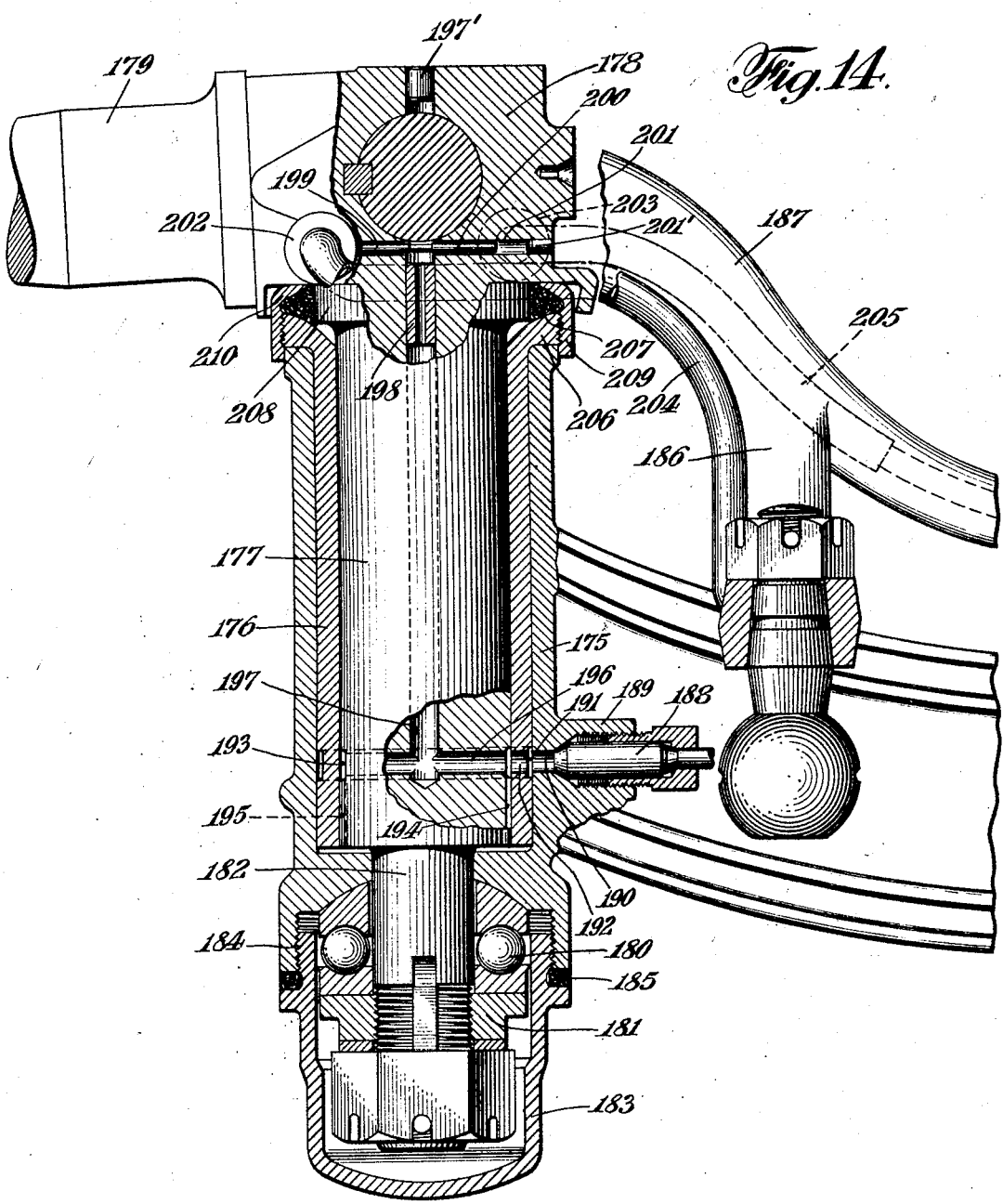

Patented June 7, 1932

1,862,513

UNITED STATES PATENT OFFICE

JOSEPH BIJUR, OF NEW YORK, N. Y., ASSIGNOR TO AUTO RESEARCH CORPORATION, A CORPORATION OF DELAWARE

STEERING KNUCKLE LUBRICATION

Application filed September 26, 1925, Serial No. 58,704. Renewed July 21, 1931.

My present invention is concerned with lubricating systems and with systems more particularly for delivering lubricant by gravity flow or displacement from a pressure line to the bearing or bearings of a structure having a swiveled or other movable connection to the structure carrying the pressure line, and especially where it is undesirable to convey the lubricant under pressure past or across such swivel or other connection.

The invention has a preferred application to the lubrication of the steering knuckles of a motor vehicle, and the broad object of delivering lubricant reliably to various knuckle bearings, and without the need for selective manipulation, or the use of auxiliary swivels or flapping conduits or other parts likely to become damaged in use and which will moreover preclude the entry of dust to the bearing surfaces.

According to one embodiment of the present invention, the lubricant is admitted to the knuckle through an inlet or terminal fitting mounted at and delivering transversely into an axle socket or eye at which the king pin or other knuckle pivot mount is supported.

In constructions in which the king pin or other pivot is secured in the axle and provides a stationary post about which the knuckle is pivoted for steering, loss of lubricant by leakage from between the axle and the fixed pivot mount is avoided by rendering the connection therebetween lubricant tight, at least in the region across which the oil is passed. Tightness of the connection may be effected, for instance, by press-fitting the king pin into the encircling axle eye or by taper fitting it thereinto, drawing the taper tight by an appropriate nut, or by feeding into the king pin through a plug or key wedged thereinto and thereby performing the additional function of locking the king pin to the axle, said plug extending either radially into the king pin or tangentially thereof.

The king pin may have a longitudinal passage or bore, from which the lubricant flows to the various bearings on the knuckle, the pivot bearings of which are closed or sealed beyond the ends of the king pin to prevent leakage of lubricant thereat, so that lubricant can flow without loss from the region of said pivot bearings to other bearings. In order to avoid leakage under pressure past the unsealed ends of the swivel or pivot bearings of the knuckle, the lubricant for the knuckle bearings is admitted through one or more drip plugs, in advance of said bearings which may be located at the axle inlet or terminal, the lubricant flowing beyond such drip plug to the knuckle bearings substantially by gravity or by mere displacement.

The division of lubricant for the knuckle bearings may be effected by extending upward the longitudinal passage in the king pin and causing overflow from the upper end thereof, through two or more courses, part passing to the upper pivot bearing, the rest being directed downwardly to the lower bearings, by way of one or more pipes or conduits carried by the knuckle. The lower king pin pivot bearing may be supplied from the upper, either through a passage in the king pin or through a conduit carried by the knuckle and bridging from the upper to the lower bearing exteriorly of the king pin. The conduit may be a distinct length of pipe having its terminals at the upper and lower clevis bearings, or may be in the form of a bore drilled in the knuckle clevis and communicating from the upper to the lower clevis jaw.

The division of lubricant according to another arrangement may be effected by the use of two or more flow controlling fittings such as drip plugs leading to distinct sets of bearings of the knuckle and said drip plugs in one embodiment carried directly on the axle and delivering, for instance, through separate and distinct bores through the axle into the knuckle, while in another embodiment the plugs or dividing means are located near the opposite ends of the king pin and supplied simultaneously through the lubricant tight inlet at the axle, by way of a longitudinal bore through the king pin.

In the type of construction, in which the king pin or other pivot mount is secured to or rigid with the knuckle and rocks therewith in a socket or eye, therefor on the axle, leakage or lubricant admitted to the pivot mount transversely through the socket or eye may be collected in a lubricant receptacle therebelow, for instance, that which encloses the thrust bearing. When said receptacle is filled, lubricant thereafter admitted must pass from the axle through the passages on the knuckle leading to the other bearings thereof.

In the accompanying drawings in which are shown one or more of various possible embodiments of the several features of the invention, Fig. 1 is a view partly in longitudinal cross section of one embodiment of knuckle with parts broken away to avoid confusion, Fig. 2 is a transverse sectional view on line 2—2 of a detail showing the inlet to the knuckle.

Fig. 3 is a sectional detail taken on line 3—3 of Fig. 1,

Fig. 4 is a view similar to Fig. 1 of another embodiment,

Fig. 4a is a fragmentary sectional view, showing an alternative arrangement for feeding lubricant to the lower knuckle bearing, Fig. 5 is a section taken on line 5—5 of Fig. 4, Fig. 6 is a transverse section taken on line 6—6 of Fig. 4, Fig. 7 is a view similar to Fig. 1 of another embodiment, Fig. 8 is a transverse section taken on line 8—8 of Fig. 7, Fig. 9 is a view similar to Fig. 1 of another embodiment, Fig. 10 is a plan view of the embodiment of Fig. 9, Fig. 11 is a sectional view taken on line 11—11 of Fig. 9, Fig. 12 is a fragmentary section showing a modification of the embodiment of Figs. 9 to 11.

Fig. 13 is an elevation of the axle of Fig. 12, and

Fig. 14 is a view similar to Fig. 1 of another embodiment.

Referring now, to Figs. 1 to 3 of the drawings, I have shown an axle 10 having a king pin 11 extending through the eye thereof upon the ends of which are pivoted the jaws 12 and 13 of a knuckle clevis, said jaws having respectively bushings 14 and 15 fitting therein. A ball thrust bearing 16 rests upon the lower clevis jaw of the knuckle and sustains the axle thereupon. The knuckle has rigid therewith, a tie rod arm 17 extending downward below the lower clevis jaw to the outer eye of which is taper fitted, a downwardly extending ball stud 18. The knuckle, illustratively the one connected to the steering gear, has a drag link arm 19 having an upstanding ball stud 20 taper fitted into the outer end thereof.

According to the present invention, I lubricate the various bearings referred to of the knuckle, that is, the king pin pivot bearings, the thrust bearing, the tie rod and the drag link bearing all from a single source on the axle. For this purpose, the lubricant which may be admitted from a central point of control through a pipe as at 21 is admitted into the king pin through a passage radially of the axle eye. In the embodiment shown, this construction comprises a plug 22 of metal threaded into the axle eye and having a tapered inner end 23 wedged into a corresponding aperture 24 laterally in the king pin to effect a lubricant-tight joint thereat. A flow control fitting 25, preferably a drip plug of the type shown in the copending application of Edward H. Kocher, Serial No. 22,104 filed April 10, 1925 is disposed in a corresponding socket in the bushing plug 22 and is held tight therein by a threaded bushing 26 encircling the same and threaded into the outer end of the plug 22 said bushing serving also, as in the copending application referred to, to effect a lubricant-tight and secure mechanical connection of the pipe 21 with the drip plug.

In the embodiment shown the king pin is provided with a relatively large diameter bore 27 extending downward from the upper end thereof to substantially the lower level of the thrust bearing. Within the king pin there is mounted an overflow pipe 28 press-fitted into the bore as at 29 below the plug inlet bore 24 and of reduced diameter thereabove to be spaced therefrom in order to provide an annular chamber 30. The lubricant admitted into the annular chamber from the drip plug fills the same and the overflow from the upper end thereof divides as will now be described. Part of the lubricant will pass outward above the beveled edge 31 of the upper bushing 14 through a bore 32 in the boss 33 into which is press-fitted a short length of pipe 34 over which is fitted the enlarged end 35 of a pipe 36 extending downward and along the drag link arm to supply the bearing thereof. Some of the lubricant will seep downward between the king pin and bushing 14 to lubricate the bearing surface thereof. The rest of the overflow from the annular chamber 30 passes inward through the interior of tube 28 downward to the lower end of the king pin bore 27 from which it drains outward through a radial bore 37 at the level of the ball bearing 16 into the thrust bearing surface.

In the embodiment shown the ball bearing unit is enclosed in a capsule comprising a base member 38 resting on the knuckle and a cap member 39 telescoped thereover upon which the axle rests. In this embodiment a star washer 40 is interposed between the capsule base and the ball bearing, providing a passage for overflow of lubricant therefrom, through one or more apertures 41 in base 38 to a peripheral groove 42 in the upper face of the lower knuckle clevis jaw, which drains into a longitudinal bore 43 in the knuckle plugged at its lower end as at 43' and draining from above said lower end through a bore 44 and a length of pipe 45 to the tie rod bearing 18. The king pin is provided with a peripheral groove 50 at the ball bearing which drains downward to supply the lower king pin pivot bearing in bushing 15 such lubricant collecting in the closed chamber 51 between the lower end of the king pin and the friction fitted closure plug 52 at the bottom thereof, the latter sealed by a screw plug 53 removable to permit driving out of the king pin in disassembly.

The drag link and the tie rod ball pivot studs are each provided with a system of bores supplied from the respective conduits, only that of the drag link being shown, including a radial bore 46 supplied directly from the piping, an axial bore 47 plugged at its upper end 47' and emitting through one or more radial bores 48 in the ball thereof. By reason of the lubricant-tight connection of the plug 22 lubricant from the axle passes without loss into the king pin bore. All of the lubricant in the first instance wells upward in the annular space 30 between the pipe 28 and the king pin bore 27 and divides in its overflow from the upper end thereof some flowing inward through the pipe 28 and bore 27 to lubricate the thrust bearing, excess from which drains to the tie rod bearing in the manner described, and to the lower king pin pivot bearing, until the corresponding chamber is filled. Other lubricant from the annular space spreads outward above the top of the king pin to lubricate bushing 14 and through the drag link pipe to supply the latter. The upper end of the upper knuckle is sealed by cap 54 to prevent entry of foreign matter.

In the embodiment of Figs. 4, 5, and 6 there is shown a knuckle construction similar to that in Figs. 1 to 3, corresponding parts being designated by the same reference numbers primed. In this embodiment the king pin is secured in the axle eye by a taper 55 therein relieved as at 56 between its ends and drawn mechanically into lubricant tight engagement with the axle eye at its upper and lower borders by pressure transmitted through a nut 57 threaded upon the king pin. A drip plug 58 similar in construction to that before referred to, is pressed by a threaded bushing 59 into tight engagement with the inner end of a socket 60 drilled into the axle which communicates through a radial bore 61 to the relieved part of the king pin between the tightened borders of the taper joint. The king pin has a radial bore 62 conveying the lubricant onward into an axial bore 63 which extends downward thereto from the extreme upper end of the king pin. In this embodiment the overflow from the axial bore 63 divides one part extending to the drag link bearing in manner identical with that described in Fig. 1, corresponding parts being designated by same reference numerals primed. To reduce the effective volume of bore 63 that must be filled before overflow occurs, said bore may be substantially filled with a pin (not shown), an arrangement similar to that at 147' in Fig. 10. Lubricant to the lower bearings instead of being conveyed through the bore of the king pin is in this embodiment shown conveyed by way of an external pipe 64 fitted at its upper end into a boss at the upper clevis jaw to drain lubricant from above bushing 14' and extending radially inward at its lower end 69 into a boss 66 in the lower clevis jaw of the knuckle, which communicates lubricant to the pivoting surface of bushing 15' through a bore 67 in the clevis jaw and an aperture 68 registering therewith in said bushing. The lubricant from the pipe 64 will fill the well 51' below the king pin and adequately lubricate the lower pivot bearing, excess beyond the requirements thereof welling up into the thrust bearing capsule thereabove to adequately lubricate the latter. In the embodiment shown the flange of the base cap 38' of the capsule is provided with a small upstanding indentation 70 registering with a longitudinal bore 71 in the lower clevis jaw which latter is plugged at its lower end at 71' as in Fig. 1 and delivers through a pipe 72 as in Fig. 1 to the tie rod bearing. It will be understood that in operation the thrust bearing here disclosed cannot be drained below the level of the rim of the flange of its base cap 38' only overflow beyond that passing through the groove 70 into bore 71 by way of pipe 72 to the tie rod bearing.

In Fig. 4a, I have shown an alternative arrangement where instead of providing a special pipe such as shown in Figs. 4 and 6 draining lubricant from the upper bushing downward to the lower, a corresponding conduit is drilled into the knuckle clevis. For this purpose, there is provided an oblique drilled bore 220 leading from the bushing of the upper clevis jaw to the crossbar 221 thereof, a similar drilled bore 222 in the lower clevis jaw and a bore 223 drilled longitudinally through the cross bar 221 of the clevis, and communicating with bores 220 and 222, bore 223 being plugged at its outer ends as at 224 to afford a continuous communication through the body of the knuckle from the upper to the lower clevis jaw.

Preferably the upper bushing $b$ is provided with a narrow notch 225 at the part thereof registering with the bore 220 and a similar notch 226 is provided in the lower bushing $b'$ at the part into which the lower oblique bore 222 delivers. The construction dispenses with the need for the extra pipe shown in Fig. 6 and by reason of the fact that the passage is within the structure of the knuckle itself, it is substantially invulnerable.

The embodiment of Figs. 7 and 8 shows the treatment of a knuckle of form modified somewhat from those of Figs. 1 to 6. The thrust bearing construction here is not provided with a separate capsule but the cup 75 enclosing the ball bearing races 76 is disposed in a relatively deep socket 77 in the lower clevis jaw and spun in at its rim at 78 to maintain the security of the assembly, the cover 79 being shallow and having a downwardly extending flange pressed by the weight of the axle thereon to effect a snug dust tight engagement with the base cup. In the present embodiment the tie rod arm 80 is keyed into the lower clevis jaw as shown and has an upwardly extending ball stud 81 fixed in the outer end thereof. The drag link arm 82 in this embodiment is shown extending obliquely downward and fitting at its upper end into a taper socket 83 forged integral with the upper clevis jaw, the security of the assembly being effected by a nut 84 threaded upon the extreme end of the arm. The lower end of arm 82 is horizontal and mounts a drag link ball stud 85 as in other embodiments.

The king pin 86 is secured to the axle and lubricant is admitted thereto from the axle by way of a wedge plug 87 forced into a cylindrical opening 88 transversely through the axle, substantially tangentially of the eye thereof and extending with its flat face across a corresponding flat 87' on the king pin. A nut 90 threaded on the smaller end of the plug 87 draws the same into mechanical and liquid-tight security with respect to the king pin flat. A lubricant inlet pipe 91 which may be supplied from an inlet for instance on the frame is secured by means of an appropriate compression coupling 92 into the larger end of the plug 87 and delivers through an axial bore 93 in said plug and a radial bore 94 widened as at 95 at its outer end into a radial bore 96 in the king pin. The latter bore communicates with an axial bore 97 extending the entire length of the king pin. Both ends of the bore 97 are enlarged and each has press-fitted thereinto a drip plug unit assembly 98' and 98² of the type above referred to. It may be briefly noted that each of the drip plug assemblies includes a highly restricted passage determined by a pin 99 extending in a bore of but slightly larger diameter, and includes also a check or relief valve 101 normally pressed against its seat by an appropriate coil spring 102 and which opens under pressure transmitted from the source. The lower drip plug 98' delivers to the well 103 therebelow closed by disk 104 and lubricant will well up therefrom to supply the lower pivot bearing 15² and thence by way of flat 105 on the king pin will pass into the thrust bearing 76. The lower ball bearing cup 75 has one or more apertures 106 in the lateral wall thereof delivering to a corresponding peripheral groove 107 in the knuckle which drains through an oblique bore 108 in the knuckle from which tie rod bearing 81 derives lubricant by way of pipe 108'. The upper drip plug 98² delivers to the cavity 109 in the upper clevis jaw thereabove sealed by cap 110 at its upper end from which the lubricant passes onward through a bore 111 in the knuckle forging to the taper socket 83 thereof and across said taper socket by way of groove 112 in the taper plug and radial bore 113 into a bore 114 in the drag link arm extending downward therealong to the corresponding ball stud 85 to deliver lubricant through the outlets 115 of the latter. The construction of the ball studs is identical with that shown in Fig. 1 and the description need not be repeated.

In operation the lubricant from the axle is propelled under the pressure from the source into plug 87 through bores 93 and 94 into bore 96 in the king pin and through the length of the latter by way of bore 97 outward through the opposite ends thereof. The pressure on the oil is absorbed or dissipated in the drip plugs so that the lubricant flows beyond said drip plugs by gravity and displacement to the corresponding bearings. The lower bearings are supplied from the lower drip plug 98' and those of higher level on the knuckle from the upper drip plug 98². The check valve 101 in the lower drip plug 98' maintains bore 97 of the king pin filled, so that when the system is operated pressure is transmitted from the source through the course indicated all of the way to the drip plugs at the opposite ends of the king pin and through a continuous column of oil filling all of the void.

In the embodiment of Figs. 9, 10, and 11, the king pin 116 is friction fitted into a corresponding cylindrical eye 117 in the axle. The knuckle straddles the axle and has clevis jaws 118 and 119 bearing on the protruding ends of the king pin. The lower clevis jaw is formed as a unitary bearing cup upon the bottom of which rests a thrust bearing block 120 having a spherical upper surface upon which the weight of the axle bears at the correspondingly rounded lower end 121 of the king pin. A bushing 122 is pressed into the bearing cup and provides a pivoting mount for the knuckle. The upper clevis jaw 118 has a bushing 123 therein encircling the upper end of the king pin, said bushing also preferably closed at its upper end by a press-fitted closure cap 124. In this embodiment the tie rod arm or in the case of the knuckle shown connected to the steering gear, both the tie rod and the drag link arms are mounted at the lower clevis jaw or bearing cup of the knuckle. For this purpose, as shown in Fig. 13

10, a unitary forging is employed including a pair of arms 125 and 126, the former for the tie rod and the latter for the drag link. The forging has a flat base 127 pressed against a corresponding flange 128 on the bearing cup 119 and secured thereagainst by a pair of bolts 129. In the embodiment shown, which illustratively also includes a brake construction, the brake shield 130 is clamped by the bolts 129 in position between the knuckle bearing cup and the arm forging.

For lubricating, the embodiment here shown, I have illustratively provided a primary dividing fitting of relatively flat construction secured within the channel structure of the axle beam preferably so as not to protrude beyond the flanges of the channel and at a distance from the king pin eye. The dividing fitting in this embodiment includes a case 131 having a pair of drip plug units 132 of identical construction and similar to those shown in Fig. 6 press-fitted into corresponding longitudinal bores 133 therein. The delivery ends of bores 133 are sealed by friction fitted plugs 134. Both of the drip plugs are supplied with lubricant in parallel from a single pipe 135 shown extending along the axle and which in turn may derive its lubricant from a point on the frame, the outlet end of said pipe having a terminal connection 136 at a corresponding nipple 137 on the case 131. The nipple delivers into a transverse passage 138 in the casing plugged at 138' at its outer end which in turn delivers laterally into the ends of the cavities 133 in which the drip plug units are lodged. The drip plug case delivers through apertures 139 in its face and between the closure plugs 134 and the adjoining ends of the drip plugs, into corresponding bores 140 drilled from the face of the axle beam, between the flanges thereof. The connection between the drip plug and the axle beam is rendered lubricant tight by clamping the drip plug case 131 against the axle beam and exerting pressure on an interposed gasket 131' by means of a bolt 141 extending therethrough between the drip plugs and drawn tight by a nut 142 at the other side of the axle. The bores 140 pass their lubricant onward toward the knuckle by way of longitudinal bores 143 and 144 drilled inward from the eye end of the axle. The friction fitted face of the king pin is slightly relieved as at 145 so that lubricant from bore 143 must pass thereinto, thence by way of a radial bore 146 in the king pin to a communicating axial bore 147 drilled downward from the upper end thereof. The bore 147 terminating but slightly below the radial bore 146, lubricant admitted from the drip plug element 131 through bore 143 must after the bore 147 is filled, overflow beyond the upper end thereof and supply the upper king pin bearing bushing 123. To reduce the effective volume of bore 147 that must be filled before overflow occurs to the upper king pin bearing, a pin 147' may be provided substantially filling said bore.

The lower axle bore 144 supplies lubricant to all of the bearings therebelow, that is, to the thrust bearing block 120 to the lower bushing 122, to the tie rod bearing and to the drag link bearing (not shown) at the outer ends of arms 125 and 126. For this purpose, a short bore 148 drilled obliquely from the lower face of the axle eye communicates with the longitudinal bore 144 and drains any lubricant admitted therethrough past a cut-away part 149' on the king pin flange 149 interposed between the knuckle bearing cup 119 and the lower end of the axle eye 117. The bushing is provided preferably with a longitudinal groove 150 extending the length thereof, said bushing terminating above the bottom of the cup 119 to leave clearance 151 by which lubricant admitted through the groove can pass to submerge the thrust bearing 120 and to pass up to the pivot within the bushing 122.

To supply the drag link and tie rod bearings, an oblique bore 152 is drilled into the flanged side of the knuckle bearing cup 119 said bore communicating at its lower end with the space 151 below the bushing 122. The bore 152 communicates through a corresponding aperture 153 in the brake shield with a short substantially horizontal bore 154 in the arm forging communicating with another short upwardly extending bore 155 terminating at the upper face of said forging. To render the joint or connection for lubricant flow across the brake shield sufficiently lubricant tight it is preferred, as shown, to provide a pair of gaskets 156 at opposite faces of the brake shield lodged and compressed in assembly within corresponding counterbores respectively in the flanged wall of the knuckle bearing cup and in the arm forging. A dividing fitting comprising a base flange 157 having an upstanding shank 158 and a pair of branched outlets 159 and 160 is secured by means of a screw 161 to the arm forging with its inlet bore 162 in shank 158 registering with the bore 155. The branch outlet 159 of the dividing fitting is connected by a lubricant conveying pipe 163 to the ball stud of the drag link bearing and in a similar manner branch 160 is connected by pipe 164 to the ball stud of the tie rod bearing. It will be understood that the dividing fitting may, if desired, be forged in an integral piece with the arm forging.

It will be noted that lubricant admitted from the bore 144 into the bearing cup 119 must in the first instance adequately submerge the thrust bearing block 120 and adequately lubricate the bushing 122 before any can pass to the drag link and tie rod bearings. This is due to the fact that the upwardly extending bores 155 and 162 in the arm forging and dividing fitting determine a trap by reason of which lubricant admitted through groove 150 must fill the cavities in the bearing cup 119 for the thrust bearing 120 and for the bushing 122 to a level at least as high as the uppermost part of the dividing fitting before any lubricant can pass onward by way of the pipes 163 and 164 to the drag link and tie rod bearings.

In order to preclude the washing of dust, dirt, or other foreign particles into the bearing cup by the flow of the oil from the bore 148 across the gap or crack between the same and the upper rim of the bearing cup 119, I have provided means to render this construction dust tight. For this purpose, the flange 149 on the king pin is encircled by a ring 165 of felt or equivalent material encased in a sheet metal cap 166 having a flange extending downwardly to substantially the rim of the knuckle bearing 119. Inasmuch as the dust excluding ring, especially when wet with oil, may render the construction also air tight and thereby prevent the venting necessary to permit the flow of lubricant down a small groove 150, I have provided instead of one of such grooves, a plurality of them illustratively, three. By this arrangement, it will be seen that as lubricant tends to flow down one or more of the grooves 150, notwithstanding the fact that the construction is sealed from the external air, air displaced from within the bushing 122 will flow upward through another one or more of the grooves 150 so that atmospheric pressure will at all times be maintained within the enclosed construction and air blocking will thereby be precluded. The danger of loss of lubricant from the thrust and pivot bearings by a siphoning action through the lower tie rod and drag link bearings is avoided by the simple expedient of forming both of said pipes 163 and 164 of bore sufficiently large to permit flow of lubricant therethrough about any air therein, so that in this part also atmospheric pressure is maintained at all times, and no column of lubricant can collect therein of weight sufficient to exert a siphoning action.

Inasmuch as the king pin has a friction fit throughout the eye of the axle, tight against passage of lubricant, except at the relieved part 145, the apertures 143' and 144' and the end 144² of the bore 144 within the eye need not be otherwise plugged or sealed to prevent the loss of lubricant therethrough.

According to the present embodiment, it will be seen that the lubricant from the source is divided in the first instance at the axle by the multiple drip plug construction 131. One of these drip plugs feeds lubricant into and upward through the king pin to supply the upper pivot bearing thereof. The other of said drip plugs feeds lubricant toward the king pin but drains the same into the bearing cup independently of the king pin to supply the thrust bearing, the lower pivot bearing, the tie rod and the drag link bearing in the manner heretofore described.

In Figs. 12 and 13 is shown a construction alternative to that shown in Fig. 9 for leading lubricant to the king pin. In this embodiment the case 230 for the drip plugs is disposed substantially at the extreme outer end of the axle near eye 231 thereof, where the channel flanges 231' of the axle beam are quite shallow, so that case 230 projects outward therebeyond. The knuckle hub 232 as shown, clears the case 230 throughout the course of its movement in steering adjustment, the knuckle structure shown in dotted lines in its limiting position substantially enclosing the drip plug case 230 in a space left between it and the axle beam. In order to clear the bolt 233, the inlet nipple 234 of the drip plug case is disposed at one side thereof, as shown, rather than centrally as indicated in Fig. 9, but otherwise the construction may be substantially the same. The bolt 235 for securing the drip plug assembly to the case may extend, as shown, through the thickened metal at the eye of the axle beam which affords an especially secure mount for the drip plug case. By the construction described, the outlet apertures 236 of the drip plug case are closely adjacent the king pin eye and accordingly, only short bores need be drilled into the axle forging as shown to feed the lubricant to the knuckle, instead of the long drilled holes used in the embodiment of Fig. 9. Specifically bores 237 and 238 are drilled substantially radially inward from the outside of eye 231, the former to feed into the king pin bore in the same manner as in Fig. 9, while a bore 239 from the lower face of the axle eye is drilled upward and communicates with bore 238 to drain lubricant to the thrust bearing cup as in Fig. 9.

In the embodiment of Fig. 14 is shown a construction in which generic principles heretofore disclosed are applied to a different type of knuckle. In this case the axle is provided with an elongated bearing socket 175 within which is friction fitted a long bushing 176 affording a bearing for the pivot stud 177 formed integral with a knuckle, the body 178 of which, extends above the axle as does the wheel spindle 179. The axle is sustained upon the knuckle by a thrust bearing 180 secured by a nut 181 upon the lower reduced end 182 of the pivot stud. The thrust bearing is enclosed in a dust-tight liquid-tight casing formed by threading an enclosing cap 183 into a corresponding socket 184 at the lower end of the axle and tightening thereby an interposed dust proofing gasket 185. The detailed construction of the thrust bearing is not of moment to the present invention and is moreover more fully described in my copending application Serial No. 56,435 filed September 15, 1925. The knuckle is provided rigid therewith with a tie rod arm 186 and in the case of the knuckle shown connected to the steering gear, also with a drag link arm 187 both protruding from the upper or body end thereof.

To lubricate the various bearings of and associated with the knuckle, I have provided a drip plug inlet 188 of the same construction above referred to lodged in a corresponding boss 189 in the axle adjacent the pivot stud 177 which drip plug may be supplied from a remote source on the frame. The drip plug feeds through a bore 190 in the boss to a peripheral groove 191 at the exterior of the bushing 176 which in turn feeds through one or more apertures 192 in the bushing to a peripheral groove 193 about the pivot stud. Two or more longitudinal grooves 194 and 195 communicate from the peripheral groove 193 to the thrust bearing chamber therebelow. The peripheral groove 193 also communicates through one or more radial bores 196 in the stud with an axial bore 197 extending from the upper end of the knuckle body downward to said radial bore. A pair of restriction pins 199 and 200 are provided leaving small clearance in a corresponding bore 201 which extends horizontally from opposite sides of the bore 197 said bore plugged at its outer end at 201'. The opposite ends of the bore 201 lead respectively to pipe terminals 202 and 203 from which the tie rod and drag link bearings are respectively supplied through corresponding pipes 204 and 205 on the knuckle.

In operation, when pressure is applied at the source, lubricant through the drip plug 188 will pass through bore 190, peripheral groove 191, aperture 192, and peripheral groove 193 and will drain through one of longitudinal grooves 194 or 195 into the thrust bearing socket, while venting of air from the thrust bearing receptacle occurs through the other of the longitudinal grooves.

After the thrust bearing well is completely charged, lubricant thereafter admitted through the drip plug will pass through radial bore 196 in the pivot stud and fill up the axial bore 197 whence it spreads in opposite directions from the upper end thereof for flow division controlled by restriction passages 199 and 200 to the tie rod and drag link bearings respectively.

In the present embodiment as in an analogous embodiment shown in my copending application Serial No. 56,435 filed September 15, 1925 the connection between the upper end of the axle socket and the knuckle is rendered dust proof. For this purpose the upper end of the bushing 176 is provided with a flange 206 resting on the socket 175 upon which is supported an annular felt gasket 207 tightly pressed about the integral flange 208 at the upper end of the pivot stud. The construction is maintained assembled by a cap 209 encircling the bushing flange and threaded thereover and having an inturned flange 210 exerting compression upon the felt annulus 207.

To reduce to a minimum, any leak through the gasket, of lubricant remaining in the oil passage thereabove, the effective volume of such passage is reduced by plugging the bore 197 at the part above the gasket with a sleeve 198 having a small bore therein, said sleeve preferably extending across the junction between the rim of the axle socket and the knuckle.

In all of the constructions disclosed as in that of my copending application, Serial No. 39,415 filed June 25, 1925 and in Patents Nos. 1,755,626, 1,755,627 and 1,755,628, the lubricant is conveyed from the pressure source through pressure tight connections by way of drip plugs or other pressure absorbing outlets, the lubricant passing therebeyond without substantial pressure across one or more of the relatively loose swivel surfaces which permit the movement of the knuckle relative to the axle.

In all of the embodiments also, I have utilized to the extent that this is applicable, the principles embodied in such copending application and broadly claimed therein for preventing the blocking by air of lubricant flow to the bearings and for obviating a siphonic action. For this purpose, the bore 43 and pipe 45 leading from the thrust bearing to the tie rod bearing in Fig. 1 and the analogous constructions shown at 71 and 72 in Fig. 4 and 108 and 108' in Fig. 6, provide a relatively large diameter bore, sufficiently large to permit flow of lubricant about any air therein so that the lubricant will readily flow therethrough and no accumulation will take place therein, notwithstanding the fact that the upper end of the conduit may not be vented by reason of the relatively enclosed construction. In the same manner and for the same purpose, the pipe 204 leading to the tie rod pivot stud in Fig. 9 is of large bore. For the same purpose also, the king pin bore 27 in Fig. 1, the pipe 64 in Fig. 4 and the bores 220—223—222 in Fig. 4a are of large diameter.

It will also be noted that the conduit leading to the drag link ball stud in Fig. 1 is also of large diameter as at 36 down to a level below that of the ball stud outlet 48 to prevent air blocking, the conduit being, if desired, of much smaller diameter as shown at 36a in the portion below the outlet in which lubricant is trapped. In a similar manner and for the same purpose, the conduit 36' leading to the drag link bearing in Fig. 4 is enlarged and a similar arrangement is provided in Fig. 14 at 205 and the bore 82 in Fig. 7 is of large diameter as shown down to a level at least as low as that of the ball stud outlet, and if desired of smaller diameter therebelow as at 82'.

In certain of the claims, I use the term "control bearing" as applying to one of the bearings of the knuckle. This term defines generically any of the bearings at the knuckle by which an operating adjustment on the knuckle or the wheel thereon is effected or transmitted from one to the other knuckle.

By the expression associated bearings as used in the specification and claims, is meant any one or more of the bearings commonly carried by or associated with the axle and/or the knuckle, such bearings including, for instance, the pivot bearings, which in the preferred embodiment consists of upper and lower king pin bearings; the thrust bearing, which in the preferred embodiment is positioned between the axle eye and the lower arm of the clevis jaw; and the drag link and/or tie rod bearings. Ordinarily, the knuckle carries one of the elements of each of the following bearings, namely, the moving element of the pivot bearing, the lower element of the thrust bearing and an element of the drag link and/or tie rod bearings.

It will also be understood that while the specific drip plug construction above refered to, is preferred as the terminal from which the knuckle bearings are supplied, terminals of other construction may be employed, regardless whether they may be properly designated as drip plugs, provided only they emit the lubricant no faster than it can be accommodated in the knuckle and the bearings thereof.

I claim:

1. In a motor vehicle, in combination, an axle, a knuckle, a bearing carried thereby, a pivot mount for said knuckle at said axle, and including a portion extending above the axle, a lubricant inlet at a part rigid with said axle, a passageway in lubricant tight connection with said inlet and leading upward to supply lubricant from said inlet to the upper part of the knuckle structure, and a conduit carried by said knuckle draining lubricant from said upper knuckle part to said bearing.

2. In a motor vehicle, in combination, an axle, a knuckle having a portion extending above the axle, bearings carried by said knuckle, a pivot member for said knuckle encircled by a part rigid with said axle, a lubricant inlet at said axle adjacent said pivot member, a passageway leading from said inlet radially inward to an upwardly extending passage lengthwise of the pivot member, means to prevent leak from the knuckle of lubricant admitted thereto, and conduits carried by said knuckle and draining lubricant from said upper knuckle part to said bearings.

3. In a motor vehicle, in combination, an axle, a knuckle, a cylindrical pivot member for said knuckle encircled by a part of said axle, said knuckle having a part above said axle, a lubricant inlet at a part rigid with said axle delivering radially inward into said pivot mount, to an upwardly extending passageway coaxial with said pivot mount, and one or more bearings carried by said knuckle supplied by lubricant overflow from the upper end of said passageway.

4. In a motor vehicle, in combination, an axle, a knuckle, a cylindrical pivot member for said knuckle encircled by a part of said axle, said knuckle having a part above said axle, a lubricant inlet at said axle delivering radially inward into said pivot mount, to an upwardly extending passageway coaxial with said pivot mount, one or more bearings carried by said knuckle supplied by lubricant overflow from the upper end of said passageway, and means near one end of said axle passageway normally closing the same to prevent return flow therethrough of the lubricant therein by way of the inlet.

5. In a motor vehicle, in combination, an axle, a knuckle, a pivot mount for the latter encircled by a part of the former, an inlet carried by said axle between the ends of said encircling part, means effecting lubricant tight communication from said inlet to an axial bore in said pivot mount, and dividing means associated with said bore for distributing the lubricant to various bearings associated with said knuckle.

6. In a motor vehicle, in combination, an axle, a knuckle, a pivot mount rigid with the axle and encircled by a part of the knuckle, a lubricant inlet carried rigid with said axle between the ends of said encircling part and affording lubricant-tight communication from said inlet to an axial bore in said pivot mount and dividing means associated with said passage at each end of said axial bore for distributing the lubricant to the various bearings associated with said knuckle.

7. In a motor vehicle, in combination, an axle eye, a king pin secured therein, a knuckle having a clevis bearing on the protruding ends of said king pin, a thrust bearing sustaining said axle upon said knuckle, a lubricant inlet member near said axle eye and feeding into said king pin, said king pin having a passageway coaxial therewith supplied with lubricant from said inlet and restrictions at the ends of said coaxial passageway.

8. In a motor vehicle, in combination, an axle, a king pin therethrough, a knuckle having a clevis straddling the axle and bearing about the protruding ends of said king pin, a thrust bearing interposed between the lower clevis jaw and the axle, a lubricant inlet through said axle delivering into a longitudinal upwardly and downwardly extending passage in the king pin and means for delivering lubricant from the lower end of said passage into the lower king pin bearing and into said thrust bearing and drip plugs positioned in the ends of said passage each consisting of a restriction and a valve.

9. In a motor vehicle, in combination, an axle, a knuckle, a cylindrical pivot mount for said knuckle encircled by the end of said axle, a bearing carried by said knuckle, a thrust bearing contiguous thereto and sustaining said axle upon said knuckle, an inlet fitting at said axle delivering into and through said cylindrical pivot mount, and leading lubricant to said bearings, one of said bearings intercepting lubricant from said inlet and the other supplied by excess from said first bearing.

10. In a motor vehicle, in combination, an axle, a knuckle having a portion extending above the axle, bearings associated with said knuckle, a pivot member for said knuckle encircled by a part of said axle, a lubricant inlet at said axle adjacent said pivot mount, a passageway leading from said inlet radially inward to an upwardly extending passageway lengthwise of the pivot member to the upper end of the knuckle, and one or more conduits carried by the knuckle leading lubricant from the upper end of said bore downward by gravity to said bearings.

11. In a motor vehicle, in combination, a knuckle, a thrust bearing thereon near the lower end thereof, an axle sustained upon said thrust bearing and below another part of said knuckle, a cylindrical pivot mount for said knuckle extending through a part of said axle and having a part extending through said thrust bearing, a control bearing carried by said knuckle, an inlet fitting carried by said axle adjacent said pivot mount, a passageway radially inward from said inlet into the knuckle pivot mount, means for supplying all of said bearings from said radial bore, said means including an upwardly extending axial conduit in said pivot mount supplied from said passageway, and a conduit carried by said knuckle supplied by overflow from the upper end of said axial passageway and leading to said control bearing.

12. In a motor vehicle in combination, an axle, a knuckle thereat, a cylindrical pivot mount through said axle forming a bearing at its opposite ends for said knuckle, a thrust bearing sustaining the axle upon the knuckle, a lubricant inlet at said axle between the bearings of said pivot mount admitting lubricant through a passageway radially inward to the pivot mount, said passageway passing lubricant longitudinally of said pivot mount to charge the thrust bearing, said thrust bearing communicating with said other bearing to supply lubricant thereto.

13. In a motor vehicle, in combination, an axle having an eye, a king pin secured therein, a knuckle having a clevis bearing on the protruding ends of said king pin, a thrust bearing sustaining said axle upon said knuckle, a lubricant inlet member near said axle eye and feeding into said king pin, said king pin having a passageway coaxial therewith supplied with lubricant from said inlet, and in communication with said thrust bearing.

14. In a motor vehicle, in combination, an axle having an eye, a king pin secured therein, a knuckle having a clevis bearing on the protruding ends of said king pin, a thrust bearing sustaining said axle upon said knuckle, a lubricant inlet member near said axle eye and feeding into said king pin, said king pin having a passageway coaxial therewith supplied with lubricant from said inlet, and in communication with said thrust bearing, the communication between the thrust bearing and the coaxial passageway being through the lower king pin bearing.

15. In a motor vehicle, in combination, an axle, a king pin through an eye thereof, having a lubricant tight fit at one part, a knuckle having a clevis straddling said axle and bearing about the projecting ends of said king pin, an inlet carried by said axle and delivering across said lubricant tight part, into a longitudinal passageway in said king pin said knuckle having one or more control bearings carried thereby and supplied from said passageway.

16. In a motor vehicle, in combination, an axle, a king pin through an eye thereof having a lubricant tight fit at one part, a knuckle having a clevis straddling said axle and bearing about the projecting ends of said king pin, an inlet carried by said axle and delivering across said lubricant tight part, into an upwardly extending passageway coaxial with said king pin through the upper end thereof, the upper clevis jaw being closed above said king pin, and a control bearing associated with said knuckle and supplied by gravity flow from the cavity between the upper end of the king pin and the closure.

17. In a motor vehicle, in combination, an axle, a king pin extending through an eye therein and having a lubricant tight fit at one part thereof, a knuckle clevis straddling said axle eye and bearing on the protruding ends of said king pin, a lubricant inlet carried by said knuckle and in lubricant tight communication with a radial bore in said king pin, said king pin having an axial bore supplied from said radial bore and closed therebelow to cause lubricant admitted thereto to pass upward through the upper end of the king pin, and one or more bearings associated with the knuckle supplied by overflow from said king pin.

18. In a motor vehicle, in combination, an axle, a knuckle at the end thereof, a cylindrical pivot mount for said knuckle encircled by the end of said axle and having a bearing associated therewith, a thrust bearing sustaining said axle upon said knuckle, an inlet fitting at said axle contiguous to said pivot mount and feeding lubricant thereinto, and an axial passageway through said pivot mount leading to one end thereof, said thrust bearing and said associated bearing being lubricated with oil from said axial passageway, one of said bearings being supplied directly from said passageway and the other supplied by excess or overflow beyond that filling said first bearing, said first bearing being constructed and arranged to prevent other leak of lubricant therefrom.

19. In a motor vehicle, in combination, an axle, a king pin therethrough, a knuckle having a clevis straddling said axle and bearing on the protruding ends of said king pin, a control bearing carried by said knuckle, a lubricant inlet carried by a part rigid with said axle and feeding radially into said king pin, a longitudinal passageway extending upward through said king pin from said radial passage, and an overflow passageway carried by the knuckle and supplied from said axial passageway to feed lubricant to said control bearing.

20. In a motor vehicle, in combination, an axle, a knuckle at the end thereof, a cylindrical pivot mount for said knuckle encircled by the end of said axle comprising pivot bearings, a thrust bearing sustaining said axle upon said knuckle, an inlet fitting rigid with said axle in lubricant-tight communication with said pivot mount and feeding lubricant thereinto, and an axial passageway through said pivot mount, said thrust bearing and said pivot bearings being lubricated with oil from said axial passageway, said pivot bearings being supplied directly from said passageway and the thrust bearing being supplied by excess or overflow beyond that filling one of said pivot bearings.

21. In a motor vehicle, in combination, an axle, a king pin secured in an eye thereof, a knuckle including a control bearing and having a clevis straddling said axle eye and bearing on the protruding ends of said king pin, means closing the upper end of the upper clevis, a lubricant inlet affixed in said axle eye and feeding into said king pin through a passageway therein terminating at the upper end of said king pin below said closure cap, and a conduit movable with the knuckle and feeding overflow of lubricant from the upper end of the king pin downward to said control bearing.

22. In a motor vehicle, in combination, an axle, a king pin secured in an eye thereof, a knuckle including a control bearing and having a clevis straddling said axle eye and bearing on the protruding ends of said king pin, means closing the upper end of the upper clevis jaw, a lubricant inlet affixed in said axle eye and feeding into said king pin through a passageway therein terminating at the upper end of said king pin below said closure means, a conduit movable with the knuckle and feeding overflow of lubricant from the upper end of the king pin downward to said control bearing, and means at one end of said king-pin passageway to impede gravity return flow of lubricant thereinto.

23. In a motor vehicle, in combination, an axle, a king pin therethrough, a knuckle having a clevis pivoted on the protruding ends of said king pin, a thrust bearing sustaining said axle upon the lower clevis jaw, a lubricant inlet carried by the axle and in lubricant tight connection with an upwardly extending passageway coaxial of the king pin, a conduit carried by the knuckle and extending from the upper clevis jaw to one of the bearings thereof and supplied by overflow from said king pin, and a second overflow conduit supplied from said king pin and delivering lubricant into said thrust bearing.

24. In a motor vehicle in combination, an axle, a king pin extending through an eye thereof, a knuckle having a clevis straddling said axle and bearing on the ends of said king pin, a plug member fixed in said axle and protruding into the surface of said king pin to effect a tight wedging fit therewith, an inlet fitting carried by said plug and feeding across the wedging connection into an axial bore in said king pin, and one or more bearings carried by said knuckle and in communication with said king pin bore.

25. In a motor vehicle, in combination, an axle, a king pin therethrough, a knuckle having a pivot bearing about one end of said king pin, a thrust bearing encircling said king pin, and sustaining said axle upon the upper end of said pivot bearing, means effecting a lubricant tight connection between the king pin and the axle, a lubricant inlet on the axle leading lubricant across said tight connection into an axial bore through said king pin, means delivering lubricant from said bore to said pivot bearing, said pivot bearing closed at its end to prevent leak of lubricant therefrom, whereby excess beyond the requirements of said pivot bearing will well up into said thrust bearing.

26. In a motor vehicle, in combination, an axle, a king pin therethrough, a knuckle having a pivot bearing about one end of said king pin, a thrust bearing encircling said king pin, and sustaining said axle upon the upper end of said pivot bearing, means effecting a lubricant tight connection between the king pin and the axle, a lubricant inlet on the axle leading lubricant across said tight connection into an axial bore through said king pin, means delivering lubricant from said bore to said pivot bearing, said pivot bearing closed at its end to prevent leak of luribcant therefrom, whereby excess beyond the requirements of said pivot bearing will well up into said thrust bearing, a control arm rigid with the knuckle, a control bearing at the outer end thereof and a conduit draining overflow from said thrust bearing to said control bearing.

27. In a motor vehicle, in combination, an axle, a king pin therethrough provided with an axial bore, a knuckle having a pivot bearing about one end of said king pin, a thrust bearing encircling said king pin and sustaining said axle upon the upper end of said pivot bearing, a lubricant inlet rigid with the axle and affording lubricant-tight connection with respect to the axial bore, means delivering lubricant from said bore to said pivot bearing, said pivot bearing structure being closed at its end to prevent leak of lubricant therefrom, whereby excess beyond the requirements of said pivot bearing will well up into said thrust bearing.

28. In a motor vehicle, in combination, an axle eye, a knuckle having a clevis jaw extending therebelow and thereabove, a pivot bearing fixed in said axle eye and extending into bearing openings in said clevis jaw above and below said axle, means admitting lubricant into said pivot bearing and means for closing the top and bottom of the bearing openings in the clevis jaw so as to form chambers into which lubricant is delivered from said admitting means before it is supplied to the pivot bearings.

29. The combination of claim 28 in which the pivot bearing consists of a king pin extending above and below the axle eye in which it is permanently fixed, in which the clevis jaw has bearing portions extending above and below the ends of the king pin and in which the closing means consists of caps closing said extensions to form shallow chambers above and below said king pin.

30. In a motor vehicle, in combination, an axle, a knuckle having a clevis jaw extending therebelow, a thrust bearing sustaining said axle upon said clevis jaw, a pivot bearing extending into said clevis jaw, means admitting lubricant into said pivot bearing and means closing the bottom of said pivot bearing, in order that excess lubricant will well up therefrom in said thrust bearing.

31. In a motor vehicle, in combination, an axle, a knuckle having a clevis jaw extending therebelow, a thrust bearing sustaining said axle upon said clevis jaw, a pivot bearing extending into said clevis jaw, means admitting lubricant into said pivot bearing and means closing the bottom of said pivot bearing, in order that excess lubricant will well up therefrom into said thrust bearing; a control bearing carried by the lower part of said knuckle, and a conduit carried by said knuckle leading excess lubricant from said thrust bearing to said control bearing.

32. In a motor vehicle, in combination, an axle, a king pin therein, a knuckle having a clevis straddling the protruding ends of said king pin, a plug wedging transversely through said axle across said king pin to effect a lubricant-tight connection therewith, a lubricant inlet affixed in the outer end of said plug and communicating through a bore therein radially into said king pin across said lubricant tight connection, an axial bore in said king pin, one or more bearings carried by said knuckle and corresponding conduits leading lubricant thereto from said king pin bore.

33. In a motor vehicle, in combination, an axle, a knuckle having a clevis straddling the same, a king pin fixed in said axle and providing a bearing mount for the clevis jaws of said knuckle, a lubricant inlet fixed in said axle, an upwardly extending tubular passage longitudinally through said king pin communicating lubricant from said inlet, said tubular passage affording an overflow from the upper end thereof leading to a bearing on the knuckle.

34. In a motor vehicle, in combination, an axle, a knuckle, a king pin affording a pivot bearing for said knuckle on said axle, control bearings carried by said knuckle, means supplying lubricant to said control bearings, said means comprising a lubricant inlet in said axle, a lubricant tight connection from said inlet to said king pin and communicating with a passage longitudinally of said king pin; flow control means, located near the opposite ends of said king pin and supplied from end of said passage and conduits delivering lubricant from the respective control means to the corresponding control bearings.

35. In a motor vehicle, in combination, an axle, a king pin therethrough, a knuckle having a clevis bearing on the protruding ends of said king pin, a lubricant inlet at said axle, a lubricant tight connection from said inlet into said knuckle, an axial bore through the length of said king pin supplied from said inlet, pressure-absorbing flow rate controlling means lodged in the opposite ends of said king pin and supplied from said bore, control bearings carried by said knuckle and associated with the respective clevis jaws thereof and conduits carried by said knuckle delivering the lubricant from said rate controlling elements to the respective control bearings.

36. In a motor vehicle, in combination, an axle, a king pin fixed therein, a knuckle having a pivot mount thereon, an arm rigid with said knuckle, a control bearing on said arm, means admitting lubricant from said axis through a lubricant tight passage into said king pin, a drip plug fixed in said king pin emitting lubricant from said king pin, means effecting a liquid tight closure adjacent said drip plug and a conduit supplied from between said drip plug and said closure and leading to said control bearing.

37. In a motor vehicle, in combination, an axle, a kin pin therethrough, a plug member locking said king pin to said axle and affording a lubricant tight connection therewith, means admitting lubricant through said plug into said king pin, a knuckle having a pivot mount on a protruding end of said king pin, a bore through said king pin supplied from said inlet and draining through one end thereof, a drip plug in said king pin controlling the flow of lubricant from said king pin bore, means closing the end of said knuckle beyond said king pin to effect a lubricant tight cavity supplied from said drip plug, a control arm rigid with said knuckle extending from said king pin end and a conduit draining said cavity and leading to said control bearing.

38. In a motor vehicle, in combination, an axle, a king pin therethrough, a knuckle having a clevis straddling said axle and bearing about the protruding ends of said king pin, means closing the ends of said clevis to prevent leak of lubricant therefrom, a control bearing arm rigid with the upper clevis jaw and a control bearing arm rigid with the lower clevis jaw each of said arms having a bearing at the outer end thereof, means admitting lubricant from said axle to both of said control bearings, said means comprising a lubricant inlet plug fixed in said axle, locking said king pin thereto and admitting lubricant into said king pin to a longitudinal bore through the length thereof, a drip plug unit in each end of said king pin, and conduits along the respective arms delivering lubricant from the respective drip plugs to the corresponding control bearings.

39. In a motor vehicle, in combination, an axle, a king pin secured therein, a knuckle having a pivot mount on said king pin and including a bearing above said axle, a downwardly extending drag link arm having a taper fit at said knuckle bearing and having a bearing in the outer end thereof, means on said axle admitting lubricant into said king pin to deliver upward therebeyond and a passage through said knuckle structure across said taper bearing and through said drag link arm to supply the bearing thereof.

40. In a motor vehicle, in combination, an axle, a king pin therethrough, a knuckle having a clevis straddling said axle and bearing on the protruding ends of said king pin, an oblique drag link arm having a taper fit at the upper part of said knuckle and having an upstanding drag link pivot stud in the outer end thereof, means admitting lubricant through said axle into a longitudinal upwardly extending bore in said king pin, a passage transversely through said knuckle draining therefrom and a passage bored through said drag link arm to supply said drag link bearing, said passage being of diameter sufficiently large to permit flow of lubricant about any air therein down to a level below that of the ball stud outlet, and being of smaller bore therebeyond.

41. In a motor vehicle, in combination, an axle eye, a knuckle, a pivot bearing for the knuckle encircled by a part of said axle, a thrust bearing sustaining the axle upon the knuckle, said thrust bearing directly above said pivot bearing and enclosed to prevent leak of lubricant therefrom, means to admit lubricant through said enclosing axle part to said pivot bearing, the latter having an overflow communication leading excess beyond that charging the same into the thrust bearing.

42. In a motor vehicle, in combination, an axle, a knuckle, said knuckle having a pivot bearing at said axle, a control bearing structure including an arm extending from said pivot bearing, means feeding lubricant into said pivot bearing and a passageway draining lubricant from said pivot bearing to said control bearing, said passageway communicating with the lower part of said pivot bearing and extending upward therefrom to a level determining a trap assuring a definite minimum level of lubricant for the pivot bearing.

43. In a motor vehicle, in combination, an axle, a knuckle having a pivot mount thereat, a lubricant inlet through said axle feeding into and through an axial bore in said pivot mount, means associated with the pivot mount of said knuckle controlling the division of the lubricant and conduits on the knuckle connecting the divided lubricant to bearings carried by the knuckle.

44. In a motor vehicle, in combination, an axle, a knuckle having a clevis straddling the same, a king pin through said axle providing a bearing for the jaws of said clevis, a thrust bearing sustaining said axle upon said knuckle, a plug fixed in said axle extending laterally into said king pin and providing a lubricant-tight connection therewith, a lubricant inlet fitting delivering into said plug, a pipe press-fitted into an axial bore in said king pin and providing clearance with respect thereto above the lubricant inlet, and a passageway near the lower end of said bore leading overflow from the exterior of said pipe through said bore into said thrust bearing.

45. In a motor vehicle, in combination, an axle, a king pin therethrough, a knuckle having a clevis, the jaws of which bear about the ends of said king pin, a thrust bearing interposed between the lower jaw and said axle and sustaining the latter, a lubricant inlet fixed in said axle adjacent said king pin, a pipe press-fitted in a longitudinal bore in said king pin and affording clearance therewith above said inlet to afford a tubular passage, said inlet connecting with said tubular passage by a lubricant tight connection and a radial bore through said king pin communicating with said thrust bearing from near the lower end of said bore to convey to the thrust bearing lubricant overflowing through the bore from the tubular passage.

46. In a motor vehicle, in combination, an axle, a king pin fixed therein, a knuckle having a clevis bearing about the protruding ends of said king pin, a thrust bearing interposed between the lower clevis jaw and said axle, a pipe fixed in a longitudinal bore in said king pin and providing a tubular clearance with said bore above its lower end, a lubricant inlet fixed to said axle and communicating through a lubricant tight passage into the clearance between the pipe and the bore, said bore terminating near the level of said thrust bearing, a radial bore through said king pin delivering overflow from said pipe into said thrust bearing, and a pipe carried by the knuckle leading to one of the control bearings thereof and supplied by overflow from above said clearance.

47. In a motor vehicle, in combination, an axle, a king pin extending through an eye thereof and having a lubricant-tight fit therein at one part thereof, a knuckle having a clevis, bushings in the jaws thereof bearing on the protruding ends of said king pin, a lubricant inlet carried by said axle and delivering lubricant across the pressure-tight connection with said king pin into an upwardly extending axial bore in said king pin, and a pipe connected into the upper clevis jaw and intercepting overflow of lubricant from above the upper bushing and extending downward to admit the lubricant for supplying the lower bushing.

48. In a motor vehicle, in combination, an axle, a king pin having a taper fit therein, a nut threaded on said king pin and tightening said taper to effect an oil-tight connection, a knuckle having a clevis straddling said axle and bearing on the protruding ends of said king pin, a lubricant inlet fitting carried by said axle and delivering lubricant across said taper fitted connection into an axial bore in said king pin, and one or more conduits carried by said knuckle supplied from said axial bore and leading lubricant to bearings associated with said knuckle.

49. In a motor vehicle, in combination, an axle, a king pin therethrough fixed therein, a knuckle having a clevis straddling said axle and bearing on the ends of said king pin, a lubricant inlet carried by said axle and feeding lubricant through an upward bore in said king pin to the upper clevis bearing, and a conduit communicating at its opposite ends with the king pin pivot bearings and draining lubricant from the upper to the lower thereof, said conduit of diameter sufficiently large to permit flow of lubricant about any air therein.

50. In a motor vehicle, in combination, an axle eye, a king pin therethrough and pinned thereinto, a knuckle having clevis jaws with bushings therein bearing about the ends of said king pin, means delivering lubricant to said upper bushing and a passageway rigid with the knuckle delivering excess from said upper to said lower bushing.

51. The combination set forth in claim 50 in which the passageway comprises bores in the two clevis jaws of said knuckle and a conduit across said axle eye connecting said bores and parallel to the king pin.

52. In a motor vehicle, in combination, an axle, a king pin fixed thereinto, a knuckle having a clevis with bushings pressed therein and bearing about the ends of said king pin, a conduit rigid with said knuckle and communicating from the upper to the lower of said bushings, said bushings having ports in communication with the ends of said conduit to permit flow of lubricant from the upper to the lower bushing, said bore of diameter sufficient to permit flow of lubricant about any air therein.

53. In a motor vehicle, in combination, an axle, a king pin therethrough, a knuckle having a clevis, a thrust bearing upon the lower clevis jaw sustaining the axle thereon, means supplied from said axle delivering lubricant to the upper clevis jaw of said knuckle, a pipe carried by the knuckle and extending at the exterior of said axle from the upper into the lower pivot bearings to supply lubricant to the latter, and means closing the lower end thereof to prevent leak of lubricant therefrom, thereby to cause overflow into the thrust bearing.

54. In a motor vehicle, in combination, an axle, a king pin therethrough, a knuckle having a clevis, a thrust bearing upon the lower clevis jaw sustaining the axle thereon, means supplied from said axle delivering lubricant to the upper clevis jaw of said knuckle, a pipe carried by the knuckle and extending at the exterior of said axle from the upper into the lower pivot bearing to supply lubricant to the latter, and means closing the lower end thereof to prevent leak of lubricant therefrom, thereby to cause overflow into the thrust bearing, a tie rod arm rigid with the lower clevis jaw of the knuckle and having a bearing and a conduit along said clevis jaw and said arm draining overflow of lubricant from said thrust bearing to said tie rod bearing.

55. In a motor vehicle, in combination, a knuckle, a thrust bearing resting on a part of said knuckle and an axle sustained upon said thrust bearing, said knuckle having a pivot bearing below said thrust bearing on a part rigid with said axle, a control bearing rigid with the knuckle and below said thrust bearing, said thrust bearing including roller members and an enclosing capsule, means closing the lower end of said pivot bearing to prevent leakage therefrom, means admitting lubricant to said pivot bearing, whereby excess will overflow therefrom into the thrust bearing capsule, a conduit along said knuckle leading to said control bearing, the base of said capsule having an indentation draining lubricant from above the level thereof downward into said conduit to said control bearing.

56. In a motor vehicle, in combination, an axle, a king pin therethrough, a knuckle having a clevis straddling the axle and bearing about the protruding ends of said king pin, a thrust bearing interposed between the lower clevis jaw and the axle, an arm rigid with the lower clevis jaw and having a tie rod bearing at the outer end thereof, a lubricant inlet through said axle delivering into a longitudinal upwardly extending passage in the king pin, a conduit delivering overflow from the upper end of said passage and communicating with said thrust bearing, and a passage longitudinally of said lower clevis jaw and along said arm to supply overflow from said thrust bearing to said tie rod bearing.

57. In a motor vehicle, in combination, an axle, a king pin therethrough, a knuckle having a clevis pivoted on the protruding ends of said king pin, a thrust bearing sustaining said axle upon the lower clevis jaw, a lubricant inlet carried by the axle and in lubricant-tight connection with an upwardly extending passageway coaxial of the king pin, and an overflow conduit supplied from the upper end of the king pin and delivering lubricant into said thrust bearing.

58. In a motor vehicle, in combination, an axle, a king pin through the eye thereof, a knuckle having a clevis straddling the protruding ends of said king pin, bearings on said knuckle, a bushing threaded into a part fixed with respect to said axle, a drip plug element urged by said bushing in lubricant tight connection with the walls of a bore leading to an axial bore in said king pin, and one or more conduits supplied from said axial bore and leading to the knuckle bearings.

59. In a motor vehicle, in combination, an axle, a king pin therethrough, a knuckle having a clevis pivoted on the protruding ends of said king pin and forming bearings therewith, a thrust bearing sustaining said axle upon the lower clevis jaw, a lubricant inlet carried by the axle and in lubricant-tight connection with an upwardly extending passageway coaxial of the king pin, and an overflow conduit supplied from the upper end of the king pin and delivering lubricant into said thrust bearing, the lower bearing of the king pin being supplied by drainage from the thrust bearing and being sealed at its lower end to prevent escape of lubricant therefrom.

60. A lubricated king pin construction, the ends of which are adapted to serve as bearing surfaces comprising a king pin with an axial bore extending through the entire king pin, the ends of which are plugged by restricting devices.

61. A lubricated king pin construction, the ends of which are adapted to serve as bearing surfaces comprising a king pin with an axial bore extending through the entire king pin, the ends of which are plugged by restricting devices, the restricting devices consisting of round plugs provided with central passages which in turn are plugged by metal restriction members.

62. A lubricated king pin construction, the ends of which are adapted to serve as bearing surfaces comprising a king pin with an axial bore extending through the entire king pin, the ends of which are plugged by restricting devices, the ends of the axial bore through the king pin being enlarged and said restricting devices being press-fitted in said enlargements, each device consisting of an annular member enclosing a restriction plug and a valve.

63. In a motor vehicle, in combination, an axle, a knuckle having a clevis straddling the same, a king pin through said axle providing a bearing for the jaws of said clevis, a thrust bearing sustaining said axle upon said knuckle, a plug in said axle extending laterally into said king pin and providing a lubricant-tight inlet connection therewith, a pipe fitted into an axial bore in said king pin and providing clearance with respect thereto above the lubricant inlet connection, said bore leading overflow from the exterior of said pipe to one of said bearings.

64. In a motor vehicle of the type including an axle and a knuckle, one of which elements carries a clevis and the other of which carries an eye fitting between the jaws of said clevis, and a king pin fixed to said eye and bearing in the jaws of said clevis, said knuckle carrying a plurality of control bearings; the combination therewith of a lubricating installation for bearings associated with said knuckle comprising a lubricant inlet, a proportioning means including a stand pipe enclosed within the knuckle structure receiving lubricant from said lubricant inlet and conduits carried upon the knuckle structure fed from said proportioning means, said conduits leading to said control bearings.

65. The installation of claim 64 in which the king pin is provided with a bore in the upper part in which is fitted said stand pipe which forms an annular chamber, said inlet feeding the lower portion of said annular chamber, and means conducting the lubricant overflowing the annular chamber outwardly to the upper king pin bearing and to one of said conduits and overflowing inwardly to the lower king pin bearing and the other of said conduits.

66. In a motor vehicle of the type including an axle and a knuckle, one of which elements carries a clevis and the other of which carries an eye embraced by said clevis, and a king pin extending through the eye and into the jaws of the clevis and forming a pivotal mount with upper and lower bearings between the knuckle and the axle, said knuckle carrying a control bearing and having a thrust bearing in respect to the axle; in combination therewith of a lubricating installation for bearings associated with said knuckle comprising a lubricant inlet below the upper end of the king pin, passageways conducting said lubricant from said inlet to the upper end of the king pin, said lubricant serving to lubricate the upper king pin bearing and a conduit system for conducting the lubricant which has then been conducted to the upper end of the king pin bearing successively to the lower king pin bearing, to the thrust bearing and to the control bearing.

67. In a motor vehicle, in combination, a knuckle, a thrust bearing resting on a part of said knuckle and an axle sustained upon said thrust bearing, said knuckle having a pivot bearing below said thrust bearing on a part rigid with said axle, a control bearing rigid with the knuckle and below said thrust bearing, said thrust bearing including roller members and an enclosing capsule, means closing the lower end of said pivot bearing to prevent leakage therefrom, means admitting lubricant to said pivot bearing, whereby excess will overflow therefrom into the thrust bearing capsule, a conduit along said knuckle leading to said control bearing, said conduit draining lubricant from said capsule downward to said control bearing.

68. The combination of an axle, a steering knuckle having a clevis straddling said axle, said knuckle having associated bearings including king pin bearings therefor fixed in said axle, a lubricant supply conduit extending along said axle and delivering into said king pin between the jaws of said clevis, and a duct through said king pin for conducting the admitted lubricant to the upper end of the king pin and lubricant proportioning passages associated with the king pin for conveying the lubricant from the upper end of the king pin to said bearings.

69. The combination of an axle, a steering knuckle having control bearings and having a king pin pivot mount in the axle end, a lubricant supply conduit connected to a part of said pivot mount rigid with said axle, and communicating with a duct lengthwise of said king pin, another conduit draining lubricant from near the lower end of said knuckle axis to one of the control bearings, and a third conduit draining lubricant from near the upper end of said knuckle axis to another control bearing.

70. The combination of an axle, a steering knuckle with control bearings having a clevis straddling said axle, a king pin rigid with said axle and constituting a bearing for the jaws of said knuckle clevis, a lubricant inlet connected to said king pin between the ends thereof and communicating with a duct lengthwise of said king pin, oil collecting chambers near opposite ends of the king pin supplied with lubricant from said duct, and pipes draining said chambers and connected for supplying corresponding control bearings upon the knuckle.

71. A steering knuckle having a king pin pivot mount, tie rod and steering arms rigid with said knuckle and having bearings at their outer ends, a lubricant inlet to the knuckle, substantially at the pivot axis thereof, and communicating with a passage lengthwise of said king pin, a conduit conveying lubricant from an outlet near the lower end of said king pin and extending lengthwise of said tie rod arm to the corresponding bearing, a second conduit conveying lubricant from an outlet near the upper end of said king pin and extending along the steering arm to supply the bearing thereof, and means controlling division of the lubricant between said bearings.

72. The combination of an axle, a king pin rigid therewith, a steering knuckle having a clevis pivotally mounted upon said king pin, a lubricant inlet at a part of said knuckle mount rigid with said axle, a lubricant outlet through said knuckle at a part thereof above the lower king pin bearing, a duct through said king pin connecting the inlet and the outlet, and a collecting chamber at the top of said king pin supplied from said duct and delivering to said outlet.

73. The combination of an axle, a steering knuckle, a king pin pivotally connecting the axle and the knuckle with an upper and lower bearing surface, an inlet for lubricant to said bearings and a liquid conduit system enclosed in said knuckle structure leading to said bearings and including dammed passageways between said inlet and said bearings supplying lubricant thereto.

74. The combination of an axle, a steering knuckle having an associated bearing, a king pin pivotally connecting the axle and the knuckle with an upper and lower bearing surface, an inlet for lubricant to said bearings, and means associated with said inlet assuring proper division of the lubricant to the said upper and lower bearings and to said associated bearing, including a conduit system leading from said inlet to said upper and lower bearings and to said associated bearing.

75. The combination of an axle, a steering knuckle having an associated bearing, a king pin pivotally connecting the axle and the knuckle with an upper and lower bearing surface, an inlet for lubricant to said bearings, and means associated with said inlet assuring proper division of the lubricant to the said upper and lower bearings and to said associated bearing, including a conduit through the upper portion of the king pin provided with an overflow at the top of the king pin and means for distributing such overflow into the upper and lower king pin bearings and to said associated bearings.

76. The combination of an axle, a steering knuckle having a control bearing and having a clevis straddling said axle, a king pin bearing therefor in said axle, a lubricant supply conduit extending along said axle and delivering into said king pin between the clevis jaws, a duct through said king pin connecting said supply conduit to deliver lubricant to a chamber above the upper end of said king pin, and an external conduit tapping lubricant from said chamber and extending therefrom along the outside of the knuckle to said knuckle control bearing.

77. The combination of an axle, a steering knuckle, control bearings carried thereon, a pivot mount for said knuckle upon said axle, a lubricant inlet connected to said pivot mount between the upper and lower end thereof, lubricant passages through and along said pivot mount and conduits upon said knuckle initiating adjacent said pivot mount above and below said inlet, said passages connecting said inlet with said conduits.

78. The combination of an axle, a steering knuckle carrying a tie rod bearing, a king pin connecting the axle and the knuckle and providing pivotal bearings, means supplying lubricant to the pivotal bearings, a conduit originating near the lower end of one of the pivotal bearings and draining to said tie rod bearing, and dammed passageways leading through said bearings and connecting said means and said conduit.

79. The combination of an axle, a steering knuckle having a clevis straddling said axle, a king pin bearing therefor fixed in said axle, a lubricant supply conduit extending along said axle and delivering into said king pin between the jaws of said clevis, and a duct through said king pin connecting said supply conduit to said bearing, a restriction being provided at the end of said duct to regulate the amount of lubricant supplied to the bearing.

80. The combination of claim 79 in which the duct is provided with an outlet to the bearing and in which the restriction is formed by substantially plugging a portion of the outlet to said bearing, to restrict and control the rate of discharge of lubricant thereto.

81. Knuckle lubrication means including in combination with a steering knuckle assemblage of the type which includes upper and lower king pin bearings and a subsidiary outlying bearing, means to feed oil into a trough at the top of the king pin, an outlet passage through the knuckle clevis delivering oil from said trough to the outlying bearing and an axial bore in the king pin receiving overflow from said trough.

82. Knuckle lubrication means including in combination with a steering knuckle assemblage of the type which includes upper and lower pivotal king pin bearings and a subsidiary bearing, a distributing receiver adjacent the upper end of the king pin, means rigid with the axle to feed lubricant into said receiver, an outside passageway in lubricant intercepting relationship with said receiver delivering lubricant to said subsidiary bearing and an inside passageway through the king pin structure in lubricant intercepting relationship with said feeding means to the lower king pin bearing.

83. In a motor vehicle of the type having a chassis frame and including a front wheel knuckle and a king pin pivot mount therefor having bearings, a tie rod bearing and a steering bearing rigid with said knuckle, the combination therewith of means for lubricating the tie rod and steering bearings from a single source, said means comprising a lubricant inlet to said knuckle, outlet ducts extending along the knuckle to the tie rod and steering bearings, and means proportioning the flow from said inlet to each of said two bearings, said means being positioned between said inlet and said outlet ducts and including dividing fitting means having dams therein to control the division of lubricant to the bearings supplied therefrom.

84. In a motor vehicle of the type having a chassis frame and including a front wheel knuckle and a king pin pivot mount therefor having bearings, a tie rod bearing and a steering bearing rigid with said knuckle, the combination therewith of means for lubricating the tie rod and steering bearings from a single source, said means comprising a lubricant inlet to said knuckle, outlet ducts extending along the knuckle to the tie rod and steering bearings, and means proportioning the flow from said inlet to each of said two bearings, said means being positioned between said inlet and said outlet ducts and including dividing means having pin restricted passages therein, a pin restricted passage being connected in series to each outlet duct.

85. In a motor vehicle of the type having a chassis frame and including a front wheel knuckle and a king pin pivot mount therefor having bearings, a tie rod bearing and a steering bearing rigid with said knuckle, the combination therewith of means for lubricating the tie rod and steering bearings from a single source, said means comprising a lubricant inlet to said knuckle, outlet ducts extending along the knuckle to the tie rod and steering bearings, and means proportioning the flow from said inlet to each of said two bearings, said means being positioned between said inlet and said outlet ducts and including pin-restricted dividing means fixed relative to the axle and associated with said inlet.

Signed at New York city, in the county of New York and State of New York, this 23rd day of September, A. D. 1925.

JOSEPH BIJUR.